May 22, 1945.  C. E. OMDALEN  2,376,717
MILKING APPARATUS
Filed Sept. 2, 1938   2 Sheets-Sheet 1
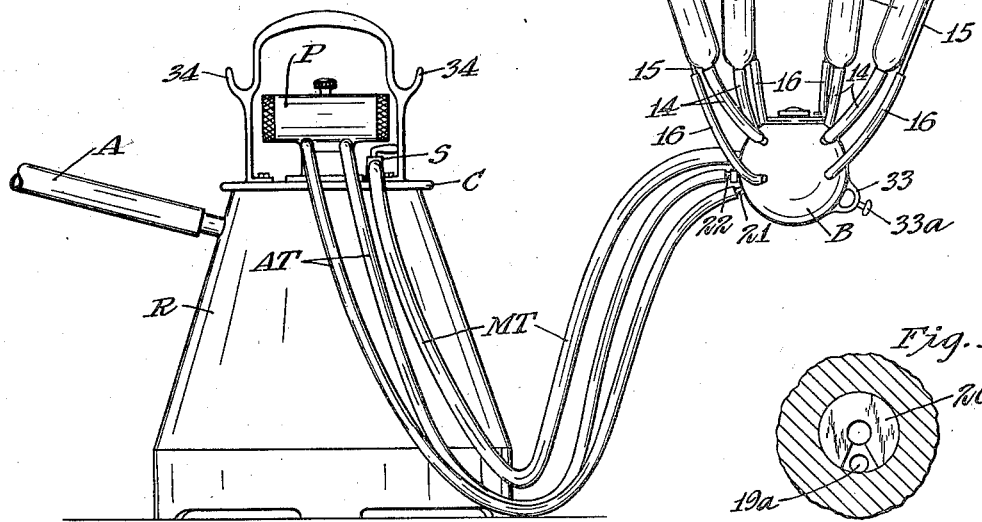
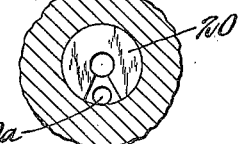
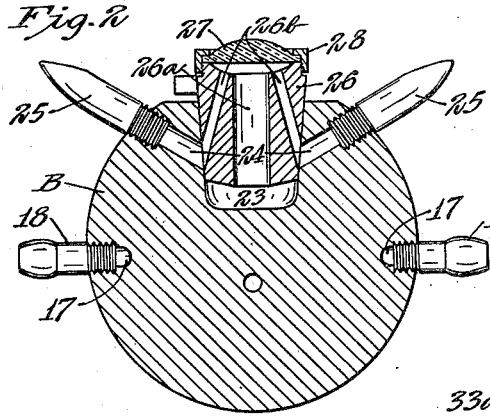
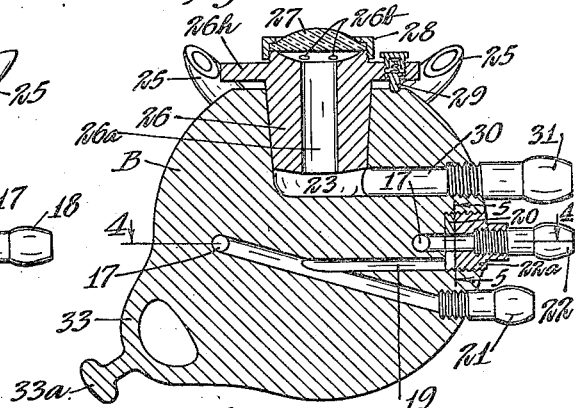
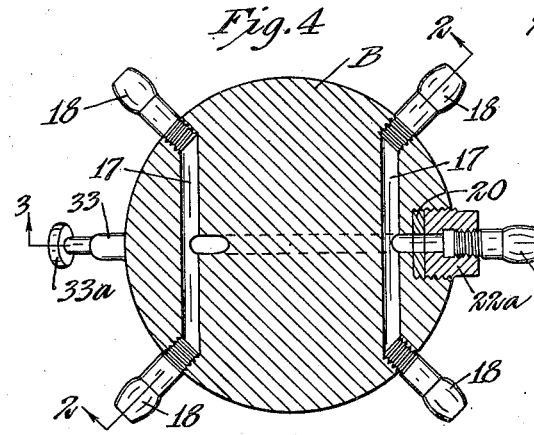
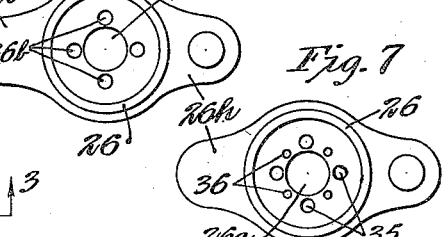
Inventor
Clarence E. Omdalen
By Williamson & Williamson
Attorneys May 22, 1945. C. E. OMDALEN 2,376,717
MILKING APPARATUS
Filed Sept. 2, 1938   2 Sheets-Sheet 2
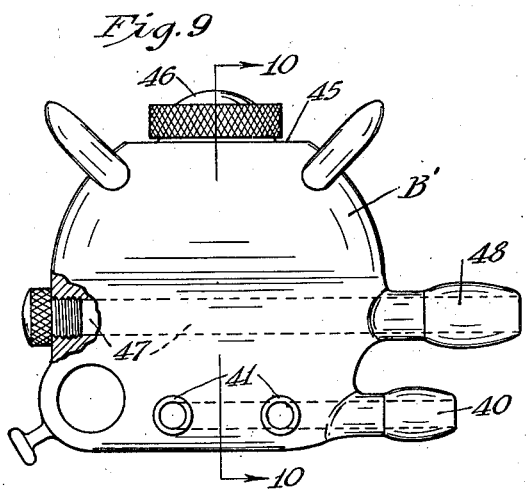
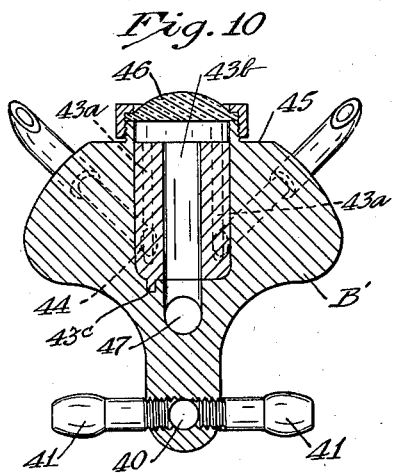
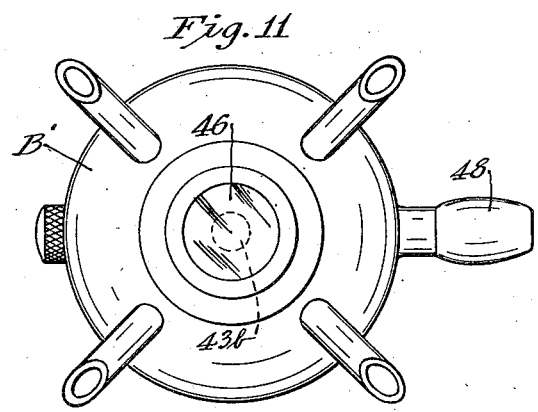
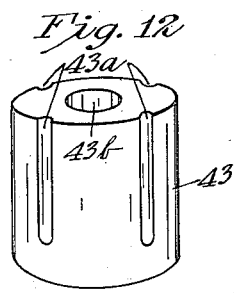
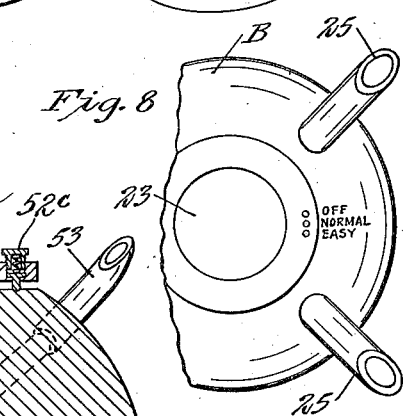
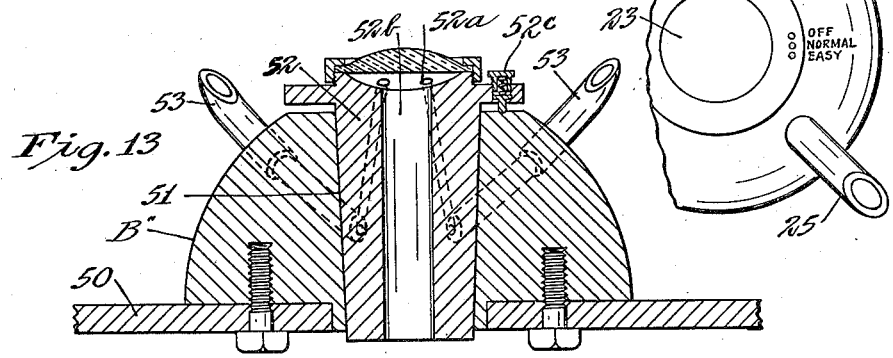
Inventor
Clarence E. Omdalen
By Williamson & Williamson
Attorneys Patented May 22, 1945

2,376,717

UNITED STATES PATENT OFFICE 2,376,717

MILKING APPARATUS

Clarence E. Omdalen, Minneapolis, Minn.

Application September 2, 1938, Serial No. 228,125

4 Claims. (Cl. 31—58)

This invention relates to milking apparatus of the suction operated type wherein a group of teat cups and usually a pulsator are connected by flexible tubes to a milk receptacle in which partial vacuum is maintained.

My invention relates particularly to means or mechanism associated with such apparatus for automatically and individually controlling the degree of partial vacuum or suction to which each individual teat of a cow is subjected in the milking process.

It is a well known fact that some cows milk easier than others throughout the entire milking operation and also that when the stripping point is reached, greater suction is required on the several teat cups than when the milk is freely flowing. It is also a fact that in any cow there is considerable variance in the milking requirements between the several individual teats.

With conventional milking machines and apparatus now in use as great a degree of partial vacuum is placed upon the teat or teats which milk very freely as upon the teats which require a higher degree of negative pressure, with the result that milking cannot be performed as naturally, as efficiently or in as short a time as it would if the proper amount of partial vacuum were supplied according to the individual needs of the cow for each of her teats.

It is an object of my invention to provide means or mechanism associated with suction operated milking apparatus wherein the flow of milk from each individual teat of the animal milked controls automatically the degree of partial vacuum to which that teat is subjected, and regulates that partial vacuum individually for each teat cup in accordance with the correct requirements.

More specifically it is an object to provide a series of suction controlling passages interposed at some point between the teat cups and the milk container or source of partial vacuum wherein each of said passages has communication at one end with the milk tube from one of the teat cups and has communication at its other end with the source of partial vacuum which may conveniently be the milk line to the container, whereby more or less suction is transmitted to each individual teat cup depending upon how much milk at any time is present in the respective or corresponding suction controlling milk passage. If the passage is practically filled with milk, this milk obstructs or restricts the effect of the partial vacuum on the corresponding teat cup, and if the passage is substantially free of milk, a considerably greater degree of partial vacuum is imposed upon the teat cups.

It is a further object to provide automatic suction control mechanism which is readily applicable to all types of suction operated milking machines now in use, and which may be economically manufactured adding very little expense to the cost of labor and materials in the manufacture of complete milking apparatus.

A further object in the preferred form of my invention is the provision in mechanism for individually and automatically controlling the suction for each teat cup of means whereby the aggregate or total degree of partial vacuum imposed upon the several cups may be varied by valve means.

These and other objects and advantages will more fully appear from the following description made in connection with the accompanying drawings, wherein like reference characters refer to similar parts throughout the various views, and in which:

Fig. 1 is a side elevation of a milking machine embodying one form of my invention and wherein the individual suction control mechanism is adapted for use either with a pulsator of the alternating milker or non-alternating milker type;

Fig. 2 is a vertical section taken on the line 2—2 of Fig. 4;

Fig. 3 is a vertical section taken on a plane disposed at a 45-degree angle to the plane of the section of Fig. 2 and taken substantially on the line 3—3 of Figure 4;

Fig. 4 is a horizontal section taken on the line 4—4 of Fig. 3;

Fig. 5 is a detail vertical section taken on the line 5—5 of Fig. 3, showing the valve for connecting the two sets of air ducts when a non-alternating pulsator is to be used;

Fig. 6 is a detail top plan view of the plug valve member having the suction control passages therein;

Fig. 7 is a similar detail plan view of a plug valve member having two sets of suction control passages embodied therein, the second set being provided for use on cows which milk very freely;

Fig. 8 is a fragmentary top plan view of the control mechanism body with the plug valve detached;

Fig. 9 is a side elevation of a somewhat different form of suction control mechanism in the form of a "claw";

Fig. 10 is a vertical section taken on the line 10—10 of Fig. 9;

Fig. 11 is a top plan view of the same;

Fig. 12 is a perspective view taken on a larger scale than that of Figs. 9–11 inclusive of the plug valve for the said second form of the invention, and Fig. 13 is a vertical section of a still different form of suction control mechanism adapted for use in the type of milking apparatus where the milk receptacle itself is suspended below the body of the cow being milked.

Referring now to the form of the invention illustrated in Figs. 1 to 8 inclusive, a receptacle or milk pail R of conventional type is employed having the usual cover C which is sealed with the upper edge of the pail and having the usual flexible air hose A which connects the milk pail with a suitable source of partial vacuum. A pulsator P of the conventional alternating type is mounted on the cover and a conventional milk spigot S is also mounted on the cover connected with the milk tube MT. The pulsator is, of course, in communication with the partial vacuum within the milk receptacle R and the air hose nipples of the alternating type pulsator are connected with two flexible air tubes AT.

A group of teat cups TC of the conventional double chamber type having the collapsible rubber inner tubes or "inflations" are employed, said inflations having flexible tubular extensions 14 which are connected respectively with nipples provided on my suction control mechanism. The outer shells of the teat cups TC have the usual metal air tube extensions 15 rigidly secured thereto which are connected by branch air tubes 16 with air nipples provided in the body of my suction control mechanism. My improved suction control mechanism is incorporated and mounted within a body member B, as shown, of spheroid shape which also acts as a manifold for the several air and milk connections to the teat cups. Extending horizontally through the central portion of the body B is a pair of spaced air ducts 17, each having communication with a pair of air nipples 18. The two sets of air nipples 18 (four in all) are connected with the branch air tubes 16 communicating with the outer chambers of the four respective teat cups. It will, of course, be understood that two air ducts 17 are provided to permit alternating pulsating action, although if the milking apparatus is designed for a non-alternating pulsator, only one of the ducts 17 is required. I have, however, in the form illustrated made provision for inter-connecting the two air ducts 17 so that the same body member may be utilized with a non-alternating type of pulsator. To this end a cross duct 19 may connect the two air ducts 17, and if an alternating pulsator is utilized, the cross duct 19 is closed by means of a rotary valve member 20 in the form of a washer (see Figs. 3 and 5) having a broken portion which may expose the end 19a of the cross duct 19 for inter-communication of the ducts 17, and which may be turned to interpose a portion of the valve member over the end 19a. Air nipples 21 and 22 communicate respectively with the two air ducts 17, the air nipple 22 being disposed axially of the valve 20 and, as shown, being threaded into a plug member 22a which is screw-threaded into the body and in operative position clamped against the valve member 20. The nipples 21 and 22 are connected by the flexible air tubes AT with the air nipples of the pulsator.

A truncated, conical valve socket 23 is formed centrally of the top of body B and with which four radially disposed milk passages 24 communicate. Milk nipples 25, as shown, are threaded into the body B, each communicating with one of the milk passages 24 and having their outer ends disposed obliquely upward for connection with the lower ends of the flexible inflation extensions 14 of the teat cups. A plug type, truncated conical valve member 26 is fitted into the valve socket 23 and, as shown, is provided with an axial, enlarged milk passage 26a through the length thereof. A transparent observation crystal or lens 27 is clamped to the upper recessed end of valve plug 26 by suitable means such as a threaded clamping ring 28 closing the upper end of the valve member. Individual suction control passages 26b (as shown, four in number), one for each teat cup, are formed in the valve member 26 having their upper or discharge ends arranged 90 degrees apart at the upper end of the valve member 26 and being inclined outwardly from the vertical to extend through the outer peripheral wall of the valve member for communication, each with one of the milk entering passages 24. These suction control passages 26b, in the form of valve members shown in Fig. 2, are all of similar diameter and of slightly less or restricted diameter than the diameter of the milk passages 24. The plug valve member 26 is provided with a handle 26h by which the valve may be slightly turned to cause the lower ends of the suction control passages 26b first to be in full registration with the milk passages 24, secondly to be in only partial registration with said milk passages 24, and thirdly to be closed by the portions of the valve socket 23 adjacent the milk passages 24. I provide simple means for accurately setting the valve member in any one of the three above designated positions, as shown, comprising a spring pressed pin 29 carried by a lateral extension or ear of the plug valve and which is adapted to be seated in any one of three small recesses formed in the appropriate portion of the top of the body B (see Fig. 8). The three positions of the valve are identified at the sides of the recesses by the terms "off," "normal" and "easy." A relatively large milk outlet passage 30 extends horizontally through the body B and communicates at its inner end with the bottom portion of valve socket 23 below the valve member. A milk hose nipple 31 is threaded into the body B co-axial with milk outlet passage 30 and in communication therewith, and this nipple 31 is connected with the outer end of the milk tube MT.

The body B as shown is provided with attachment means in order that the body and associated teat cups may be supported from a hook or slot on the milk container or other support. To this end I provide an integrally formed loop portion 33 which may engage a hook 34 mounted on the cover of the milk container, and I also provide a headed stud 33a which may engage a slotted portion of other types of milk receptacles.

*Operation*

In operation the teat cups are applied to the cow to be milked in the usual manner, the weight of the body B and its associated parts producing the necessary pull upon the teats. The spigot S on the milk line is, of course, open and the partial vacuum created retains the teat cups and mechanism upon the udder of the cow. The pulsator P operates in the conventional manner in the form shown, producing alternate pulsations on the right- and left-hand sets of teat cups TC. The collapsing of the inner tubes or inflations of the double chambered teat cups is effected in the manner well known in the art. Milk is drawn from the several teat cups TC through the inflation extensions 14 into the milk entering passages 24 of my mechanism.

It will be noted that passages 24 are of greater diameter than the several individual suction controlling passages 26b formed through the plug valve member 26, and also of somewhat larger diameter than is necessary to handle the flow from a very free milking cow.

In the form of valve member shown in Figs. 2 and 6 the normal setting of the rotary plug 26 is in a position where the lower ends of suction controlling passages 26b are not in full registration, but in partial registration, with the inner ends of the milk inlet passages 24, thus restricting to some extent the flow of milk upwardly into the central enlarged passage 26a of the valve member. Thus, if the milk taken from one teat of the cow is flowing relatively freely, the restriction brought about by the corresponding suction control passage 26b will accumulate milk in the corresponding milk inlet passage 24 and at the entrance of the suction control passage, and will obstruct passage of air and consequently lower the degree of partial vacuum transmitted to the corresponding teat cup. Likewise, if little milk is being drawn from one of the other teats, the corresponding suction control passage will freely handle all of the milk entering the same, and there will be no accumulation of milk at the entrance of that passage or in the corresponding milk inlet passage, and a considerably higher degree of partial vacuum will be transmitted to the corresponding teat cup. Through extensive experimentation it has been possible to determine the precise relative diameters of the suction control passages 26b and the milk inlet passages 24 to correctly meet the milking conditions of most cows.

The only case where it is of advantage to provide some adjustment in the relative amount of restriction imposed upon any of the individual milk entering passages 24 is in the case of an unusually free milking cow. With the usual adjustment of my suction control valve the restriction in such cases might be sufficient to lessen the partial vacuum on several of the teats to the extent that it would not be adequate to retain the teat cups and associated mechanism upon the udder of the cow. I have made provision for this unusual circumstance in the form of valve shown in Fig. 2, by making the suction control passages 26b of slightly greater diameter than is needed for restricting entrance of milk into the valve in the normal run of cows, relying on an incomplete registration, as has been stated, of said passages with the milk inlet passages 24. When an unusually free milking cow is to be milked the valve member 26 is turned to the "easy" position wherein passages 26b are in full registration with the milk inlet passages 24.

In Fig. 7 I have illustrated a slightly different form of suction control valve where two sets of suction control passages are provided, the larger passages 35 being for registration with the milk inlet ports 24 when an unusually free milking cow is to be milked, and the smaller passages 36 being in full registration with the milk inlet passages 24 for the normal cow.

In Figs. 9 to 12 inclusive, a slightly different form of suction controlling mechanism is illustrated. The body member B' in the second form is smaller in volume, being formed more nearly in accordance with conventional claws or manifolds now in use. In the form shown the mechanism is adapted for a non-alternating pulsator and only one air nipple 40 is employed, this being connected with the passage which is in communication with the two sets of air nipples 41 connected with the air hoses to the outer chambers of the respective teat cups.

The suction controlling valve member in this form is somewhat different than in the form described, constituting a stationary, cylindrical plug member 43 having a series of circumferentially spaced, longitudinally extending suction controlling grooves or passages 43a which extend from the upper end of the plug to points adjacent the lower end after registration with the inner ends of the milk inlet passages 44. Plug 43 is longitudinally removable from body B but is held against oscillation relative thereto by means of a depending dowel 43c seated in a complemental recess in the body. A flanged boss 45 is provided at the upper end of body member B', in order that the observation crystal 46 may be spaced somewhat above the upper end of plug member 43 to enable entering milk to overrun the upper edge of the hollow plug member and be drawn downwardly through the enlarged axial passage 43b. Milk, of course, is withdrawn from body member B' through the enlarged milk outlet passage 47 and the milk hose connection nipple 48.

In Fig. 13 I have illustrated an embodiment of my suction controlling mechanism adapted for milking machines of the type having the milk receptacle suspended below the body of the cow. In this embodiment, as shown, a semi-spheroidal body B'' is rigidly but detachably secured to the cover 50 of the milk receptacle. A tapered valve socket 51 having a suction control valve 52 similar to the rotary plug type valve 26 of the form of my invention first described is here employed. The valve 52 is mounted for oscillation and is provided with a spring pressed pin 53c adapted to cooperate with circumferentially spaced recesses to retain the plug in a plurality of positions as in the valve of the first form of the invention described. The nipples 53 for connection with the inflations or inner tubes of the teat cups are arranged similarly with that of the first form of my invention, communicating with milk inlet ports 52a which are arranged for registration with the several suction controlling passages. The enlarged central passage 52b of the rotary plug member communicates at its lower end with the milk receptacle wherein partial vacuum is maintained. In this type of milking apparatus there is no need for provision in my mechanism of an air manifold for connection with the outer chambers of the teat cups since such type of milking apparatus employs air tubes connecting the adjacent pulsator with the air nipples of the teat cups.

From the foregoing description it will be seen that I have provided a simple, inexpensive mechanism for not only properly controlling the aggregate amount or degree of partial vacuum transmitted to the several teat cups in accordance with the varying general milking characteristics of cows, but I have further provided mechanism for very accurately controlling the partial vacuum to which each individual teat of a cow is subjected in accordance with the specific requirements for properly milking each teat. As a result of my automatic suction control mechanism the milking operation is carried out more completely, in less time and with greater comfort to the cow than with all types of milking machines utilized at this time.

It will further be seen that the cooperation and combination of my suction controlling mechanism with the essential elements of a suction operating milking machine provides a new system of milking, and my invention in its broadest concept provides a new and materially improved method of milking a cow or other milk producing animal which essentially consists in the steps of applying partial vacuum individually to each teat of the animal to be milked, and at all times during the milking operation controlling the degrees of partial vacuum to which each teat is subjected and to the need of each teat through the flow of milk from each individual teat.

It will, of course, be understood that various changes may be made in the form, details, arrangement and proportions of the various parts without departing from the scope of my invention.

What is claimed is:

1. In combination with the several teat cups, milk line and source of partial vacuum of a milking machine, mechanism for automatically and individually controlling the degree of partial vacuum transmitted to each of said teat cups comprising, a body having a series of independent milk connections with said several teat cups respectively and having a valve socket with which said several milk connections communicate in spaced arrangement, a rotary plug valve disposed in said socket having a series of unobstructed suction control passages each being adapted for communication with one of said milk connections and being of substantially less cross sectional area than said milk connections, said valve having an enlarged central milk outlet passage in communication with said several suction control passages, and connections between said milk outlet passage and said milk line, said valve member being mounted for positioning relative to said body member for full or partial registration between said suction control passages and said milk inlet passages and also for disposition of said suction control passages in said socket to cut off communication with said several milk connections.

2. In combination with the several teat cups, milk line, milk receptacle and source of partial vacuum of a milking machine, mechanism for automatically and individually controlling the degree of partial vacuum transmitted to each of said teat cups comprising, a body having a series of independent milk connections with said several teat cups respectively and having a valve socket with which said several milk connections communicate in spaced arrangement, a rotary plug valve disposed in said socket having a series of unobstructed suction control passages each being adapted for communication with one of said milk connections and being of substantially less cross sectional area than said milk connections, said valve having an enlarged central milk outlet passage in communication with said several suction control passages, and said milk outlet passage being in communication with said milk receptacle, and means for oscillating said plug valve for positioning of the same in at least two predetermined positions wherein full and partial registration respectively between said suction control passages and communication with said milk connections may be made.

3. In combination with the several teat cups, milk line and milk receptacle of a milking machine and means for maintaining the interior of said milk receptacle at a partial vacuum, mechanism mounted on said milk receptacle for automatically and individually controlling the degree of partial vacuum transmitted to each of said teat cups comprising a plurality of unobstructed suction control passages corresponding in number to said teat cups and each having a milk connection at one end thereof with one of said cups and being of substantially uniform cross sectional area throughout but of less cross sectional area than said milk connections, said passages extending upwardly from their respective connections with said cups, a central passage communicating through said mechanism with the interior of the receptacle and with which the upper ends of said suction control passages communicate, and means for varying the area of communication between said suction control passages and said milk connections.

4. A milking apparatus of the type employed, a plurality of teat cups, a milk receptacle suspended from the animal to be milked and means for maintaining partial vacuum in said receptacle, mechanism for automatically and individually controlling the degree of partial vacuum transmitted to each of said teat cups comprising a valve socket member secured to the top of said receptacle having formed therein a plurality of circumferentially spaced milk inlet passages connected respectively with said teat cups by integral connections, a plug valve member mounted for at least slight oscillation in said valve socket member and having therein a plurality of unobstructed suction control passages corresponding in number to said teat cups and each having a port for registration with one of said milk inlet passages and being of less cross sectional area than said milk inlet passages, said suction control passages extending upwardly, said plug having a central passage at which the upper ends of said suction control passages communicate and the top of said receptacle having an opening therein in communication with said central passage.

CLARENCE E. OMDALEN.